United States Patent
Van Vredendaal et al.

(10) Patent No.: US 12,166,901 B2
(45) Date of Patent: Dec. 10, 2024

(54) LIGHTWEIGHT FAULT COUNTERMEASURE FOR STATEFUL HASH-BASED CRYPTOGRAPHY

(71) Applicant: NXP USA, Inc., Austin, TX (US)

(72) Inventors: Christine Van Vredendaal, Veldhoven (NL); Melissa Azouaoui, Norderstedt (DE); Tobias Schneider, Graz (AT)

(73) Assignee: NXP USA, Inc., Austin, TX (US)

( * ) Notice: Subject to any disclaimer, the term of this patent is extended or adjusted under 35 U.S.C. 154(b) by 281 days.

(21) Appl. No.: 17/901,546

(22) Filed: Sep. 1, 2022

(65) Prior Publication Data

US 2024/0080204 A1   Mar. 7, 2024

(51) Int. Cl.
| | | |
|---|---|---|
| H04L 9/32 | (2006.01) | |
| H04L 9/00 | (2022.01) | |
| H04L 9/08 | (2006.01) | |
| H04L 9/14 | (2006.01) | |

(52) U.S. Cl.
CPC .......... *H04L 9/3247* (2013.01); *H04L 9/0836* (2013.01); *H04L 9/14* (2013.01); *H04L 9/50* (2022.05)

(58) Field of Classification Search
CPC ....... H04L 9/3247; H04L 9/0836; H04L 9/14; H04L 9/50; H04L 9/004; H04L 9/3236
See application file for complete search history.

(56) References Cited

U.S. PATENT DOCUMENTS

| | | | |
|---|---|---|---|
| 8,327,156 B2 | 12/2012 | Furukawa et al. | |
| 9,092,621 B2 | 7/2015 | Riou | |
| 10,116,450 B1 | 10/2018 | Brown et al. | |
| 10,581,616 B1 | 3/2020 | Paruzel | |
| 2009/0164783 A1* | 6/2009 | Solis | H04L 9/3236 713/168 |
| 2016/0085955 A1* | 3/2016 | Lerner | H04L 9/0869 726/20 |
| 2018/0076957 A1* | 3/2018 | Watanabe | H04L 9/32 |
| 2020/0137090 A1* | 4/2020 | Holzhauer | H04L 63/1416 |
| 2022/0131707 A1* | 4/2022 | Chen | H04L 9/50 |
| 2022/0237287 A1* | 7/2022 | Vigilant | G06F 21/554 |
| 2022/0376923 A1* | 11/2022 | Esiner | H04L 9/3239 |

(Continued)

OTHER PUBLICATIONS

Regnath, Emanuel et al.; "AMSA: Adaptive Merkle Signature Archittecture"; 2020 Design, Automation & Test in Europe Conference & Exhibition, Grenoble FR; 6 pages (Mar. 9, 2020).

(Continued)

*Primary Examiner* — Ramy M Osman (57) ABSTRACT

A device includes a computer readable memory storing a plurality of one-time signature (OTS) keypairs and a processor that is configured to execute a hash function on a message using a first private key of a first OTS keypair of the plurality of OTS keypairs to determine a message signature, execute the hash function to calculate a leaf node value of a hash tree using the first OTS keypair, determine a plurality of authentication path nodes in the hash tree, retrieve, from the computer readable memory, values of a first subset of the plurality of authentication path nodes, calculate values for each node in a second subset of the plurality of authentication path nodes, and store, in the computer readable memory, the values for each node in the authentication path and the value of the leaf node.

14 Claims, 7 Drawing Sheets

(56) References Cited

U.S. PATENT DOCUMENTS

| | | | |
|---|---|---|---|
| 2023/0299972 A1* | 9/2023 | Villatel | H04L 9/3247 |
| | | | 713/176 |
| 2024/0080204 A1* | 3/2024 | Van Vredendaal | H04L 9/3236 |
| 2024/0089113 A1* | 3/2024 | Schneider | H04L 9/50 |
| 2024/0220640 A1* | 7/2024 | Kuijsters | G06F 21/554 |
| 2024/0223380 A1* | 7/2024 | van Vredendaal | H04L 9/50 |

OTHER PUBLICATIONS

Suhail, Sabah et al; "On the Role of Hash-Based Signatures in Quantum-Safe Internet of Things: Current Solutions and Future Directions"; IEEE Internet of Things J ournal, vol. 8, No. 1; 17 pages (Jan. 1, 2021).

Genet et al. : "Practical Fault Injection Attacks on SPHINCS" Kannwishcher, Oct. 15, 2015, 18 pages.

Mozaffari-Kermain et al "Fault Detection Architectures for Post-Quantum Cryptographic Stateless Hash-Based Secure Signatures Benchmarked on ASIC" ACM Trans. Embed. Comput. Syst. 16, 2, Article 59 (Nov. 2016), 19 pages.

Castelnovi et al.: "Grafting Trees: a Fault Attack against the SPHINCS Framework" International Conference on Post-Quantum Cryptography, Part of the Lecture Notes in Computer Science book series (LNSC, vol. 10786), Apr. 1, 2018, pp. 165-184.

* cited by examiner

| Sig $q$ | node index $i$ | Auth path | | | | # leaf node |
|---|---|---|---|---|---|---|
| 0 | 16 | 17 | 9 | 5 | 3 | 15 |
| 1 | 17 | 16 | 9 | 5 | 3 | 1 |
| 2 | 18 | 19 | 8 | 5 | 3 | 2 |
| 3 | 19 | 18 | 8 | 5 | 3 | 1 |
| 4 | 20 | 21 | 11 | 4 | 3 | 4 |
| 5 | 21 | 20 | 11 | 4 | 3 | 1 |
| 6 | 22 | 23 | 10 | 4 | 3 | 2 |
| 7 | 23 | 22 | 10 | 4 | 3 | 1 |
| 8 | 24 | 25 | 13 | 7 | 2 | 8 |
| 9 | 25 | 24 | 13 | 7 | 2 | 1 |
| 10 | 26 | 27 | 12 | 7 | 2 | 2 |
| 11 | 27 | 26 | 12 | 7 | 2 | 1 |
| 12 | 28 | 29 | 15 | 6 | 2 | 4 |
| 13 | 29 | 28 | 15 | 6 | 2 | 1 |
| 14 | 30 | 31 | 14 | 6 | 2 | 2 |
| 15 | 31 | 30 | 14 | 6 | 2 | 1 |

FIG. 4

| Sig $q$ | node index $i$ == KeepNode | Auth path | # leaf node | # leaf node + fault countermeasure |
|---|---|---|---|---|
| 0 | 16 | 17 9 5 3 | 15 | 15 + 1/2 |
| 1 | 17 | 16 9 5 3 | 1 | 1 + 1/2 |
| 2 | 18 | 19 8 5 3 | 2 | 1 + 1/2 |
| 3 | 19 | 18 8 5 3 | 1 | 1/2 |
| 4 | 20 | 21 11 4 3 | 4 | 3 + 1/2 |
| 5 | 21 | 20 11 4 3 | 1 | 1/2 |
| 6 | 22 | 23 10 4 3 | 2 | 1 + 1/2 |
| 7 | 23 | 22 10 4 3 | 1 | 1/2 |
| 8 | 24 | 25 13 7 2 | 8 | 7 + 1/2 |
| 9 | 25 | 24 13 7 2 | 1 | 1/2 |
| 10 | 26 | 27 12 7 2 | 2 | 1 + 1/2 |
| 11 | 27 | 26 12 7 2 | 1 | 1/2 |
| 12 | 28 | 29 15 6 2 | 4 | 3 + 1/2 |
| 13 | 29 | 28 15 6 2 | 1 | 1/2 |
| 14 | 30 | 31 14 6 2 | 2 | 1 + 1/2 |
| 15 | 31 | 30 14 6 2 | 1 | 1/2 |

LIGHTWEIGHT FAULT COUNTERMEASURE FOR STATEFUL HASH-BASED CRYPTOGRAPHY

TECHNICAL FIELD

The present disclosure is directed in general to a system and method for processing stateful hash-based cryptographic signatures and, specifically, to a system and method utilizing an efficient hash tree traversal method that may be used by devices with constrained memory resources or other embedded computing systems to process stateful hash-based cryptographic signatures.

BACKGROUND

Digital cryptographic signatures play an important role in the world's data communication infrastructure. Such signatures underpin important authentication and transaction validation communication infrastructures in the form of cryptographic certificates to secure digital transactions occurring on the internet or across other communication networks. Often, such authentication and validation systems are implemented by resource-constrained devices, such as those participating in Internet of Things (IoT) networks or other types of sensors, actuators, and appliances, to transmit and receive data and to validate the authenticity of received instructions and commands.

In order to make digital signatures accessible to such resource-constrained devices, it can be important to minimize the resource requirements and optimize the efficiency of the involved cryptographic signature processing algorithms (e.g., key generation, signing and verification). Additionally, many such devices operate as embedded computing systems, which may expose those devices to physical attacks that can involve direct attempts to insert values (e.g., in a fault-injection attack that may involve causing a device to process signature data for inaccurate or malicious data) into cryptographic data being processed. Such attacks may allow an attack to improperly sign manipulated data or to validate data that has been improperly signed. Accordingly, cryptographic signature processing algorithms for these types of devices (and others) should enable some degree of protection against fault injection attacks.

Commonly used signature schemes include the Rivest-Shamir-Adleman (RSA) cryptosystem and variants of the Elliptic Curve Digital Signature Algorithm ((EC)DSA) cryptosystem. However, with the likely development of quantum computing systems, the security of RSA and (EC) DSA cryptosystems may be threatened. As a potential remedy to the risks posed by quantum computing, hash-based signature (HBS) cryptosystems (such as the eXtended Merkle Signature Scheme (XMSS)) can increase the complexity of a cryptosystem to ensure reliable security, even if cryptographic attacks are generated by quantum computing systems. The security of these HBS cryptosystems rely on the cryptographic strength of hash functions and the pseudorandom cryptographic function families used in implementing such systems. These are cryptographic primitive functions that are well-studied, understood, and may be relatively invulnerable to attacks by quantum computers.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter of the application and uses of such embodiments. As used herein, the words "exemplary" and "example" mean "serving as an example, instance, or illustration." Any implementation or embodiment described herein as exemplary, or an example is not necessarily to be construed as preferred or advantageous over other implementations. Furthermore, there is no intention to be bound by any expressed or implied theory presented in the preceding technical field, background, or the following detailed description.

At the core of hash-based signature (HBS) cryptosystems lies a binary-tree-graph structure (e.g., a hash tree or Merkle tree) in which leaf nodes (i.e., the lowermost layer) of the binary-tree-graph correspond to public keys of one-time signature (OTS) key pairs. These public keys are constructed from OTS secret keys using various hash functions. Hash functions implement mathematical operations that receive an input of arbitrary length and generate, based on that input, an output that is a pseudorandom ciphertext of a fixed length. Hash functions are characterized in that it is very difficult to calculate the input to a hash function based upon an input value. In typical embodiments of HBS cryptosystems, these binary-tree graph structures are referred to as Merkle trees. Cryptographic signatures are created and validated by computing a number of hashes of values associated with different nodes of a Merkle tree.

Figure 1:
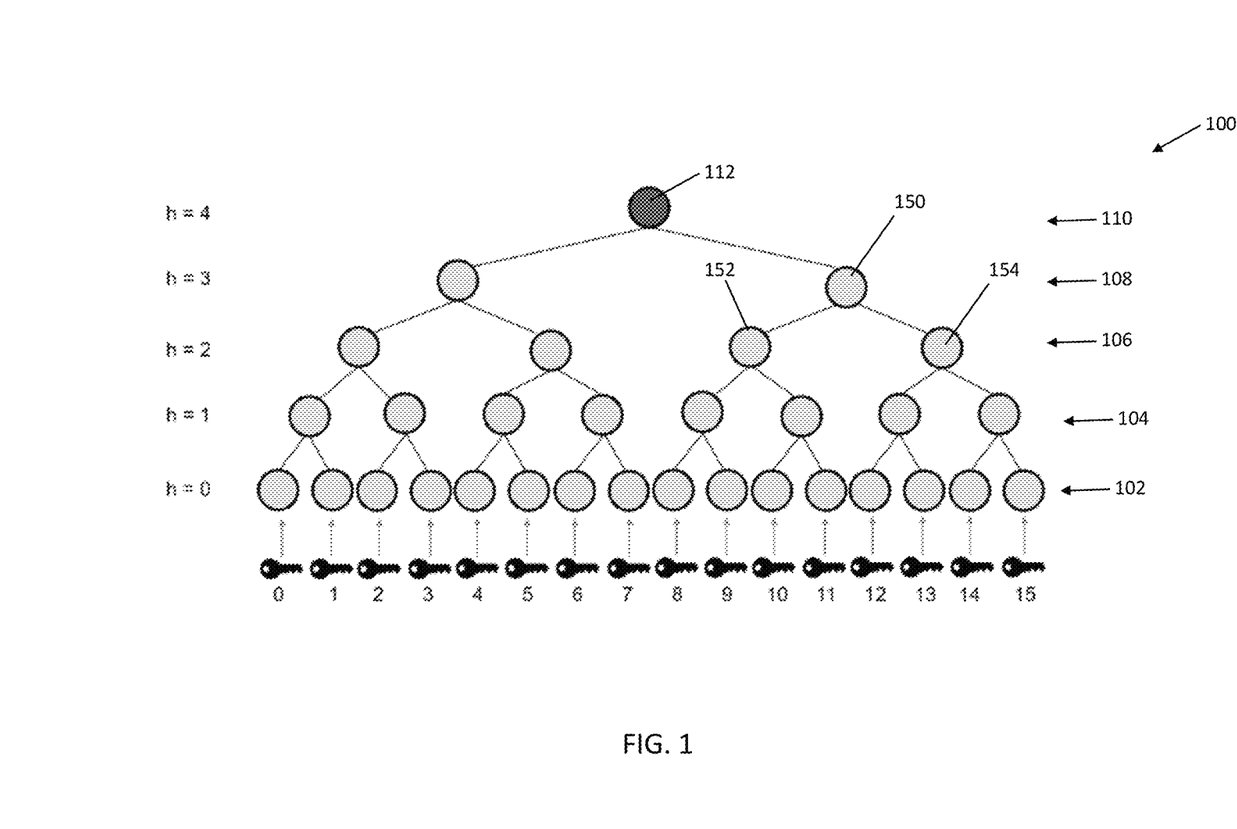
FIG. 1 illustrates an example binary-tree-graph structure that may be utilized in conjunction with an HBS cryptosystem.

FIG. 1 illustrates an example binary-tree-graph structure that may be utilized in conjunction with an HBS cryptosystem. As shown in FIG. 1, tree 100 includes 16 OTS keys (key pairs) at the leaf nodes (i.e., the keys with indexes 0 through 15 associated with the various leaf nodes) at the tree's lowest level 102. In total, tree 100 has five different levels or layers that include level 102 (the lowest level), 104, 106, 108, and 110 (the level of the tree's root node 112). In accordance with mathematical convention, the levels of Merkle tree 100 are referred to by the variable h so that the levels (also referred to herein as layers) in tree 100, from the lowest level up to the root level, are h=0, 1, 2, 3, 4.

Each node in tree 100 (represented by the individual circles) consist of an n-byte hash value. The lowest layer 102 (i.e., the leaf nodes of tree 100) consists of the hashed public keys of the various OTS key pairs. The public key of the Merkle tree 100 is then the value of root node 112 of Merkle tree 100. At each level of tree 100 above the lowest level 102 (ie=h=0), the various nodes of Merkle tree 100 are constructed by taking pair-wise hashes of the values of the two node pairs in the immediately lower layer. For example, with reference to Merkle tree 100 the value of node 150 is equal to the hash of the value of node 152 combined with the value of node 154. In this example, node 152 may be referred to as the "left hand" node and node 154 may be referred to as the "right hand" node of the pair of nodes 152 and 154.

The Merkle tree 100 can be constructed by initially executing pair-wise hashes on the nodes (or leaves) of the lowest layer 102 to generate each of the nodes in layer 104. The nodes in layer 104 are then processed in a series of pair-wise hashes to generate the nodes of layer 106. This process repeats to generate the nodes of layer 108 and, finally, the two nodes of layer 108 are combined and hashed to generate the root node 112 of layer 110.

When signing a message, the signer cryptographically signs the message with a previously unused private key from an OTS keypair that is found in the Merkle tree 100. The signer then sends the generated signature of the message, along with a corresponding authentication path to a verifier. In this scheme, the authentication path may be utilized to allow the verifier to verify an OTS signature against the public key of the applicable Merkle tree 100 instead of using the OTS public key that was used by the signer.

Figure 2:
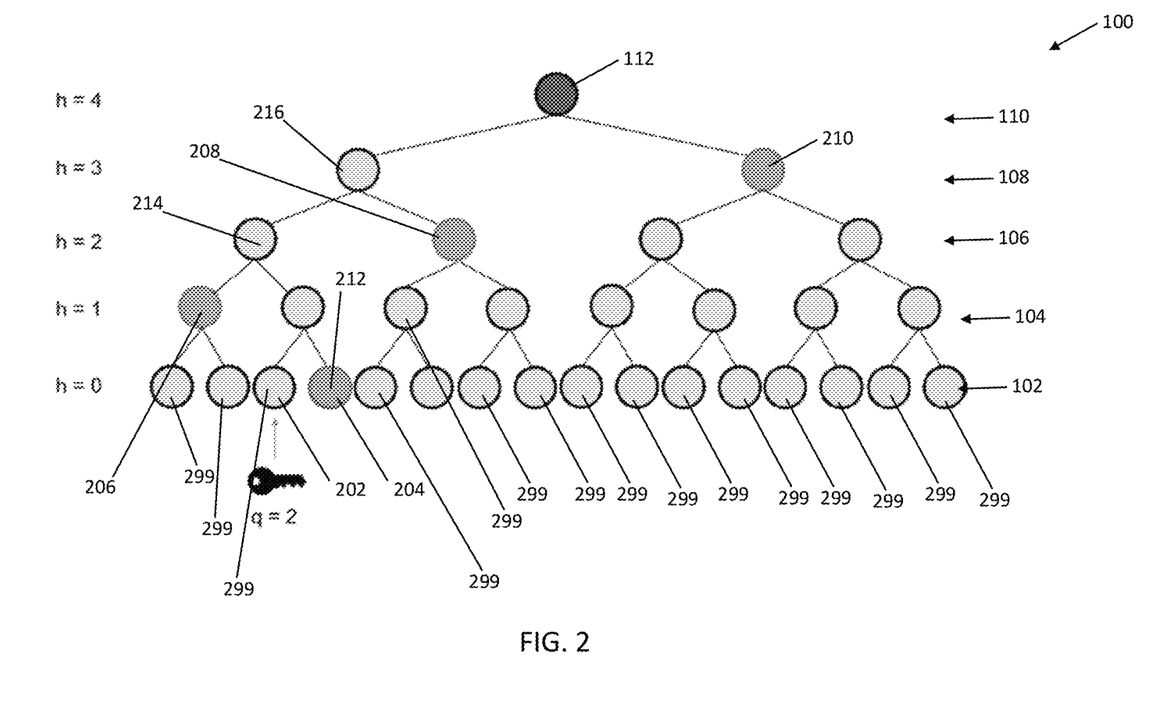
FIG. 2 depicts the Merkle tree of FIG. 1 in which certain nodes have been highlighted to illustrate the authentication path that is generated when the signer has signed a message using the OTS key having the index q=2.

To illustrate, FIG. 2 depicts the Merkle tree 100 of FIG. 1 in which certain nodes have been highlighted to illustrate the authentication path that is generated when the signer has signed a message using the OTS key having the index q=2 (i.e., node 202). In that case, the authentication path is made up of the values of the nodes of tree 100 that must be known in order to calculate the root node 112 based upon the key used to sign the message (i.e., the key of node 202). In this example, where the OTS key of node 202 is utilized to sign the message, the authentication path includes leaf nodes 204, 206, 208, and 210.

When transmitting a signed message, the signer sends the full OTS signature, which includes the signature of the message (e.g., generated by executing a cryptographic signing function on the message) as well as the authentication path (i.e., the values of the nodes making up the authentication path for the leaf node associated with the OTS private key used to the sign the message). Upon receipt of the message signature and the authentication path, the receiving device (i.e., the verifier) first calculates the OTS private key that was used to sign the message using the OTS message signature received from the signer. The verifier then applies a hash to that private key to calculate the corresponding Merkle tree leaf node (i.e., in this example, the corresponding Merkle tree leaf node is node 202 of Merkle tree 100).

With the value of node 202 calculated, the verifier then applies, in order, a series of pairwise hashes on the values of the nodes in the authentication path provided by the signer. Specifically, the verifier executes a first pairwise hash with inputs of the value of node 202 and the value of node 204 as received in the authentication path to generate node 212. Once node 212 is calculated, the verifier executes a second pairwise hash with inputs of the value of node 212 and the value of node 206 as received in the authentication path to generate node 214. Once node 214 is calculated, the verifier executes a third pairwise hash with inputs of the value of node 214 and the value of node 208 as received in the authentication path to generate node 216. Once node 216 is calculated, the verifier executes a fourth pairwise hash with inputs of node 216 and the value of node 210 received in the authentication path to generate another node value that should match node 112—the root node of tree 100. If this final result matches the public key of the tree 100 (i.e., the value of root node 112), the signature is verified as each of nodes 212, 214, 216 and 112 have been properly calculated using the node values from the authentication path that was supplied by the signing device.

For the signer, computing the authentication path is a computation-intensive task. If the signer begins calculating the authentication path using just the OTS secret keys (often stored in the form of a seed value), the signer must re-compute a majority of the nodes of tree 100 in order to determine the authentication path for a single signed message. For example, with reference to FIG. 2 as part of calculating the authentication path for node 202, the signing device must calculate the values of all of leaf nodes 299, a substantial computational task.

If the signing function is being executed on a computing resource with larger memory resources, the signer could store the entirety of the Merkle tree 100 in a memory system. For larger Merkle trees (e.g., with h=10, 15 or even 20), however, this may require storage of more than 50 kilobytes (kB) or even megabytes (MB). Storage of this amount of data may be infeasible on constrained devices, such as those commonly executing signed transactions as Internet of things (IoT) devices.

These constraints can result in resource-constrained devices consuming a significant amount of compute resource when signing transactions using an HBS cryptosystem. Additionally, these constraints can expose such devices to cryptographic attacks that may inject false or otherwise faulty values into a device's Merkle tree computed data structure to create invalid or even forged signatures.

To mitigate this risk, it may be possible for a device to calculate a message signature twice (i.e., sign the message twice and compare the results) to provide a countermeasure against a falsified or forged signature. If both calculated signatures are identical, that may indicate a low likelihood of a fault-injection attack. However, this approach can be quite expensive in terms of utilized computing resource and can lead to some protocol standard compliance issues. Some communication standards, for example, explicitly ban signing a message twice with the same key even if the same message is being signed both times.

Accordingly, in the present disclosure a system and method are provided in which a lightweight tree traversal method is utilized for message signature and verification. The approach reduces data storage requirements (allowing it to be executed on resource-constrained devices) and, additionally, can protect against some fault-injection attacks, as described herein.

Specifically, the present approach may be implemented in conjunction with a signature verification method that does not require recomputing the message signature in favor of performing a verification of the signature. As described herein, this, on average, requires approximately the same number of hash computations as conventional approaches, but avoids the re-computation of one-time signatures. The present approach may be implemented in conjunction with the storage and re-use of nodes of the pertinent Merkle tree that are computed in this manner to provide a lightweight tree traversal approach. In turn, this approach can lead to a low-memory tree traversal algorithm with inherent fault countermeasure characteristics whose hash-computations can be achieved with minimal compute cost.

In the present disclosure, the value h designates the height of a Merkle tree (e.g., tree 100 of FIG. 1). The OTS key-pair leaves of a Merkle tree of height h can be used to sign $2^h$ messages. The pairwise hash-values in the Merkle tree are referred to as nodes, with the byte-size of these nodes (equal to the size of a hash function output) is denoted by n. In typical applications, n=24 or n=32. The Winternitz parameter w, is a value that controls the application of the hash function to generate the Merkle tree node and is chosen from the set {4, 16}. The parameter can be used to achieve a trade-off between signature size and signing speed. The number is typically chosen from the set {2, 4, 16, 256} and is used to achieve a trade-off between signature size and signing speed. The parameter l is equal to the number of n-byte elements in a WOTS+ private key, public key, and signature.

A Merkle-tree-based many-signature scheme signature typically consists of 3 elements: [q, σ, A], where q is the index of the Merkle tree leaf node whose corresponding OTS private key was used to construct signature a, and A is the authentication path (i.e., a list of the values of the nodes making up the authentication path) corresponding to that leaf node (e.g., as illustrated in FIG. 2 and described above). When implementing a cryptosystem the 3 elements of the Merkle-tree-based many-signature scheme signature may be encoded into a message that may be transmitted to a remote device (e.g., via communications interface 734).

The effort of computing the authentication path can be expressed in terms of the number of leaf nodes that need to be computed when computing the authentication path. Although there are some additional hash computations in the construction of the Merkle tree itself, the leaf node computations require the most work (i.e., deriving the leaf nodes values from the OTS key pairs stored by the signing device), and can be used to compare the performance of different Merkle tree traversal algorithms.

In this disclosure, an example is presented in which a Merkle tree of height h=4 and signature with index q=2 are utilized (as depicted in FIG. 2). The example is used to present and describe aspects of the present invention however, it should be understood and apparent to a person of ordinary skill in the art that the approaches presented herein are applicable to Merkle tree structures of any size and as applied to signatures generated by keys with any valid index within the pertinent Merkle tree.

When calculating an authentication path for a message signature using an HBS cryptosystem, the authentication path can be calculated by a device that only stores the private OTS keys of a Merkle tree rather than the entire Merkle tree itself. With the OTS private key values for the Merkle tree, all remaining nodes of the Merkle tree can be calculated via a series of pairwise hash operations, as described above. Consequently, this approach may be utilized by a device that is attempting to minimize an amount of stored data (e.g., the verifier has limited memory resources) while implementing an HBS cryptosystem.

For a signature being processed using a Merkle tree having a height h and using a signature with index q, the authentication path consists of h nodes, where the node at a height $h_i \leq h$ is the root of a subtree that can be computed from its $2^{h_i}$ lower or leaf nodes. Since these subtrees are all pairwise disjunct, the full effort for the computation path is thus $\Sigma_{i=0}^{h-1} 2^i = 2^h - 1$ leaf node computations. In the present example (i.e., a Merkle tree with height h=4) this would amount to $\Sigma_{i=0}^{3} 2^i = 15$ leaf computations for each signature to be processed.

To reduce the computational burden of signature verification, an approach may enable authentication path computation to occur without any storage beyond the authentication path itself. That is, there is no requirement that the values of all other nodes (or even a majority of other nodes) in the Merkle tree be stored by the device.

In embodiments, an authentication path of a previously processed signature may be stored to provide tree traversal optimization. In that case, if the signatures are processed/verified in an ascending order of the indices q, then the calculated authentication path nodes at height $h_i$ are present in $2^{h_i}$ subsequent signatures. As such, by storing (i.e., not deleting) those previously calculated prior authentication path nodes, the method can reduce the number of required node computations when processing additional signatures.

When processing a first signature (i.e., using the key having index q=0), computation of the authentication path requires $2^h - 1$ leaf node computations. As such there may be no performance saving when processing a first signature using a first OTS key of an example Merkle tree as compared to conventional approaches. However, once calculated, the nodes used in processing that first signature are stored during the key generation process and, as described below, increase the method's efficiency for the computing of later signatures.

With those nodes stored, when processing later leaf nodes with index q mod $2^{h_i}=0$, the authentication path node(s) at height $h_i$ need to be determined for the next signature. Straightforwardly computing those leads to $\Sigma_{0 \leq i < h, q \bmod 2^i = 0} 2^i$ leaf computations. This leads to each node being computed once and an average of $$\frac{\Sigma_{0 \leq i < h} 2^h}{2^h} = h$$

leaf nodes per computation when including the maximal $2^h - 1$ leaf node computations for q=0 and $$\frac{\Sigma_{0 \leq i < h} 2^h - 2^i}{2^h - 1} \approx h - 1$$

if excluding it.

When h=τ is the highest height at which a node in the authentication path changes when processing a new signature, then the node at that height changes from a right node or right handnode, to its corresponding left node, presuming the signatures are being processed in order of increasing index q. From this same analysis computing a right handnode always consists of full computation of all its right hand leaf nodes, while a left node can be computed from previously processed nodes. Conversely, a left node with no storage beyond the authentication path can be computed with 1 leaf node computation+τ hashes in the Merkle tree.

Figure 3:
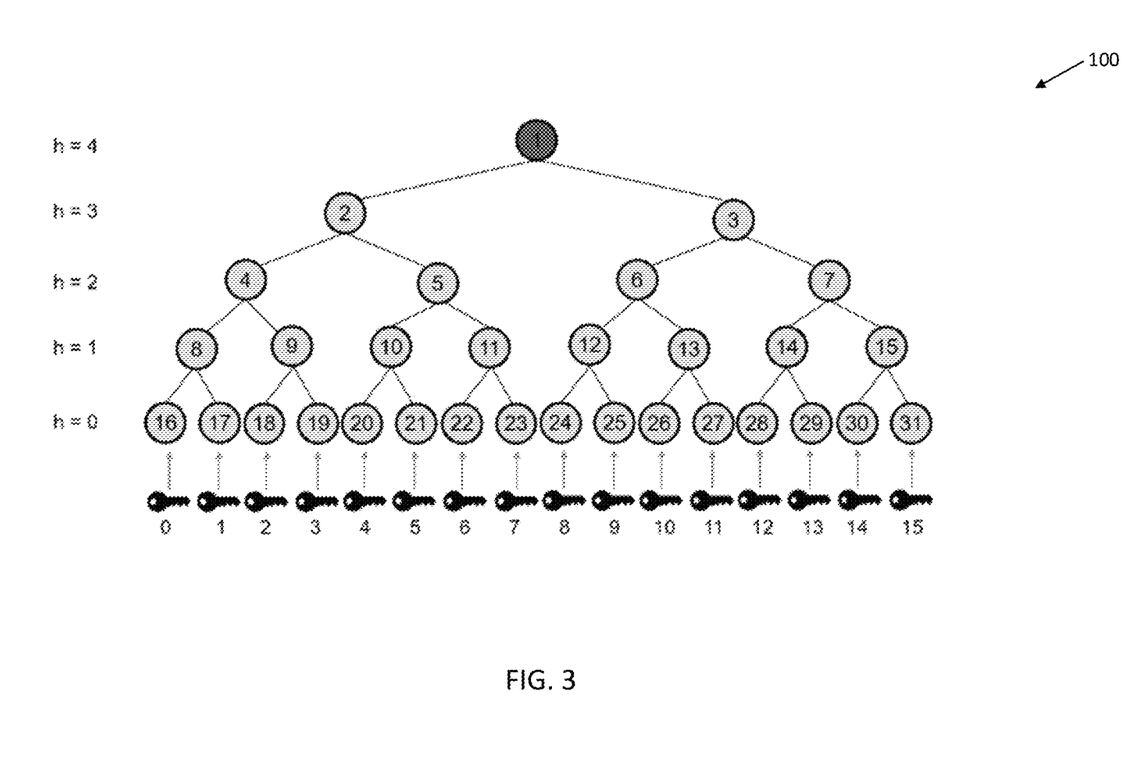
FIG. 3 depicts a Merkle tree in which each node of the tree has been assigned a unique number.

FIG. 3 depicts the Merkle tree 100 of the present example in which each node of tree 100 has been assigned a unique number. The nodes of tree 100 are numbered top to bottom and left to right, resulting in the leaf node corresponding to the keypair with index q having the number q+2h.

When processing signatures using tree 100 in the order of increasing index q, it is apparent that every $2^i$ signatures, a portion of the authentication path will swap from a right-hand node (i.e., of the two nodes being provided as input to the pairwise hash function being used to calculate the authentication path) to a left-hand node and vice versa. This swap will occur within the authentication path at height i every $2^{i+1}$ signatures. The height at which such a swap occurs is referred to by the symbol τ.

Figure 4:
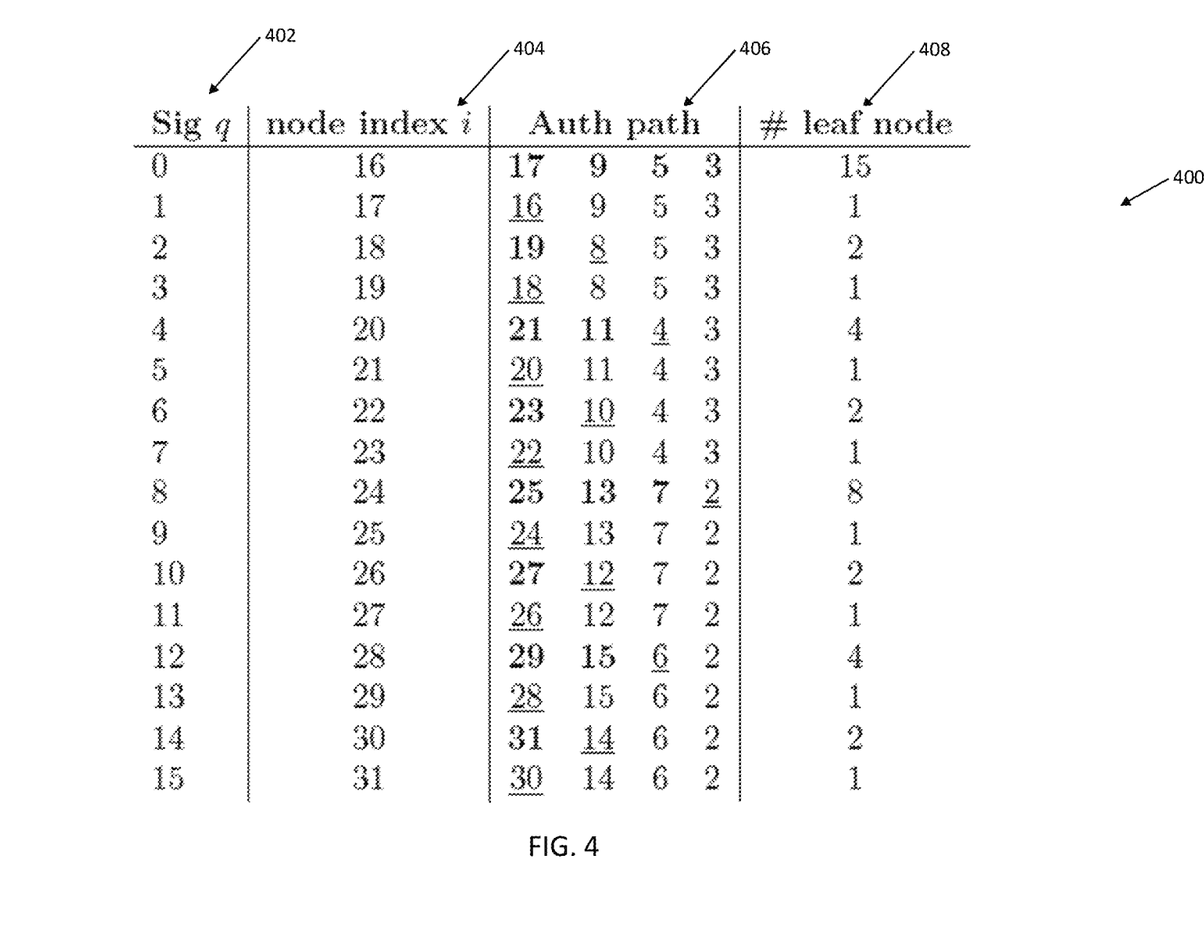
FIG. 4 is a table showing the authentication paths used when processing, sequentially, signatures using a Merkle tree in order of index q.

To further illustrate this phenomenon, FIG. 4 is a table 400 showing the authentication paths used when processing, sequentially, signatures using the Merkle tree 100 of the present example in order of index q. In table 400, the first column 402, Sig q, represents the index q of the OTS key pair used to process a signature. The second column 404, node index i, displays, for the given index q, the node associated with the OTS key used to process the signature. The third column 406, Auth Path, shows, for the given index q, the sequence of nodes that make up the authentication path. The fourth column 408, # leaf nodes, displays the number of leaf nodes that must be calculated to determine the authentication path for that index q, presuming that signatures are being processed in the sequence order and that the previously calculated authentication path values are being stored.

Within table 400, if a node number in the authentication path is bolded, that indicates that the node in the authentication path is a right-hand node whose value must be calculated. Similarly, if a node number in the authentication path is underlined, that indicates that the node in the authentication path is a left-hand node whose value must be calculated. As this method stores previously calculated authentication path node data, node numbers in the third column of table 400 that are neither bolded nor underlined do not require calculation, as those nodes values have been previously determined and stored and can be retrieved from memory.

With reference to table 400, it is apparent that τ is equal to the largest value 0≤i≤h such that q mod $2^i$==0, and the cost is then equal to $1+\Sigma_{i=0}^{\tau-1} 2^i$ if τ>0 and 1 otherwise.

On average this amounts to the algorithm requiring all right-hand nodes in the various authentication paths to be calculated a single time to process the entire Merkle tree 100, with only 1 leaf computation per left node and leads to an average of $$\frac{\sum_{0 \le i < h} 2^{h-1} + 2^{h-i-1}}{2^h} \approx h - 1.$$

As such, the approach of storing previously calculated authentication path nodes can provide some computational efficiency over storing no previously calculated node data.

When cryptographically signing a message using an HBS cryptosystem, an approach to mitigate the risk of fault-injection cryptographic attacks at the time of signing calls for calculating the cryptographic signature twice and confirmation that the two signatures are identical. In an HBS cryptosystem the output of the signature operation is a value that contains the value q (the index of the key being used to perform the cryptographic signature), the value $\sigma_{wots}$ (which includes values specifying how the cryptosystem operates), and A (the values of the nodes along the authentication path for the key having index q). The signature function may therefore be expressed as follows:

$$(q, \sigma_{wots}, A) \Leftarrow \text{Sign}(q, \text{message}). \quad (1)$$

Accordingly, the process of signing a message twice and then comparing the signature results as a mechanism for protecting against fault attacks may be expressed as follows:

$$(q, \sigma_{wots}, A) \Leftarrow \text{Sign}(q, \text{message}). \quad (2)$$

$$(q', \sigma'_{wots}, A') \Leftarrow \text{Sign}(q, \text{message}). \quad (3)$$

$$(q, \sigma_{wots}, A)? = (q', \sigma'_{wots}, A'). \quad (4)$$

The cost of executing a single signature operation is, on average, $w*\ell/2$ hash operations, or half a leaf computation. Consequently, performing this computation twice as part of a fault-injection countermeasure would therefore cost $w*\ell$, or a full leaf computation.

To reduce this computational overhead, while still providing countermeasures against fault injection, the present approach calls for first signing a message to generate the signature data q, $\sigma_{wots}$, and A only a single time. Then, instead of recalculating the signature data, a verification function is executed on the originally calculated signature according to the process described above. An output of the verification process is a value for the root node of the pertinent Merkle tree. If the calculated root node matches the public key (i.e., the stored value of the root node) of the Merkle tree, the signer can confirm that the original signature was not corrupted. This approach for mitigating the likelihood of fault-injection attacks may be expressed as follows:

$$(q, \sigma_{wots}, A) \Leftarrow \text{Sign}(q, \text{message}). \quad (5)$$

$$\text{ROOT} \Leftarrow \text{Verify}((q, \sigma_{wots}, A), \text{message}). \quad (6)$$

$$PK? = \text{ROOT} \quad (7)$$

When performing signature verification according to the process set forth in expressions (5), (6), and (7), the number of hash computations required to complete the process is approximately $w*\ell + h$, or about 1 leaf computation. As such, this approach, which provides enhanced fault-injection protection, requires the same computational effort because the sign + verify balances out the message dependence.

As described below, a Merkle tree traversal algorithm can be implemented in which improvements in efficiency due to calculated node storage (as described above in conjunction with FIG. 4) can be combined with an approach for fault-injection mitigation (as described above) to provide enhanced security characteristics.

In a specific embodiment, a tree traversal algorithm is proposed in which calculated nodes are stored for later use (e.g., in accordance with the method described above with respect to FIG. 4) in addition to an additional "KeepNode," as described below. The approach may be expressed as follows:

$$(q, \sigma_{wots}, A) \Leftarrow \text{Sign}(q, \text{message}). \quad (8)$$

$$\text{ROOT}, \text{KeepNode} \Leftarrow \text{Verify}((q, \sigma_{wots}, A), \text{message}) \quad (9)$$

$$PK? = \text{ROOT} \quad (10)$$

As illustrated by expressions (8), (9), and (10) the full storage requirements for this approach requires the device executing the process to store the values of the previously determined authentication path A (which has a size of h*n bytes) and the value of the KeepNode (n bytes) for a storage total of (h+1)*n bytes. During execution of the process, the KeepNode is typically the leaf node that would need to be computed for the left-hand nodes of the authentication path A (i.e., the nodes that are underlined in the Auth Path column of table 400 of FIG. 4). As such, although this approach requires the spending of approximately a ½ leaf node of effort in performing fault-injection countermeasure, and the storage of the additional n bytes of KeepNode, the approach saves 1 leaf's worth of computation effort in the tree traversal and requires a manageable amount of data storage.

Figure 5:
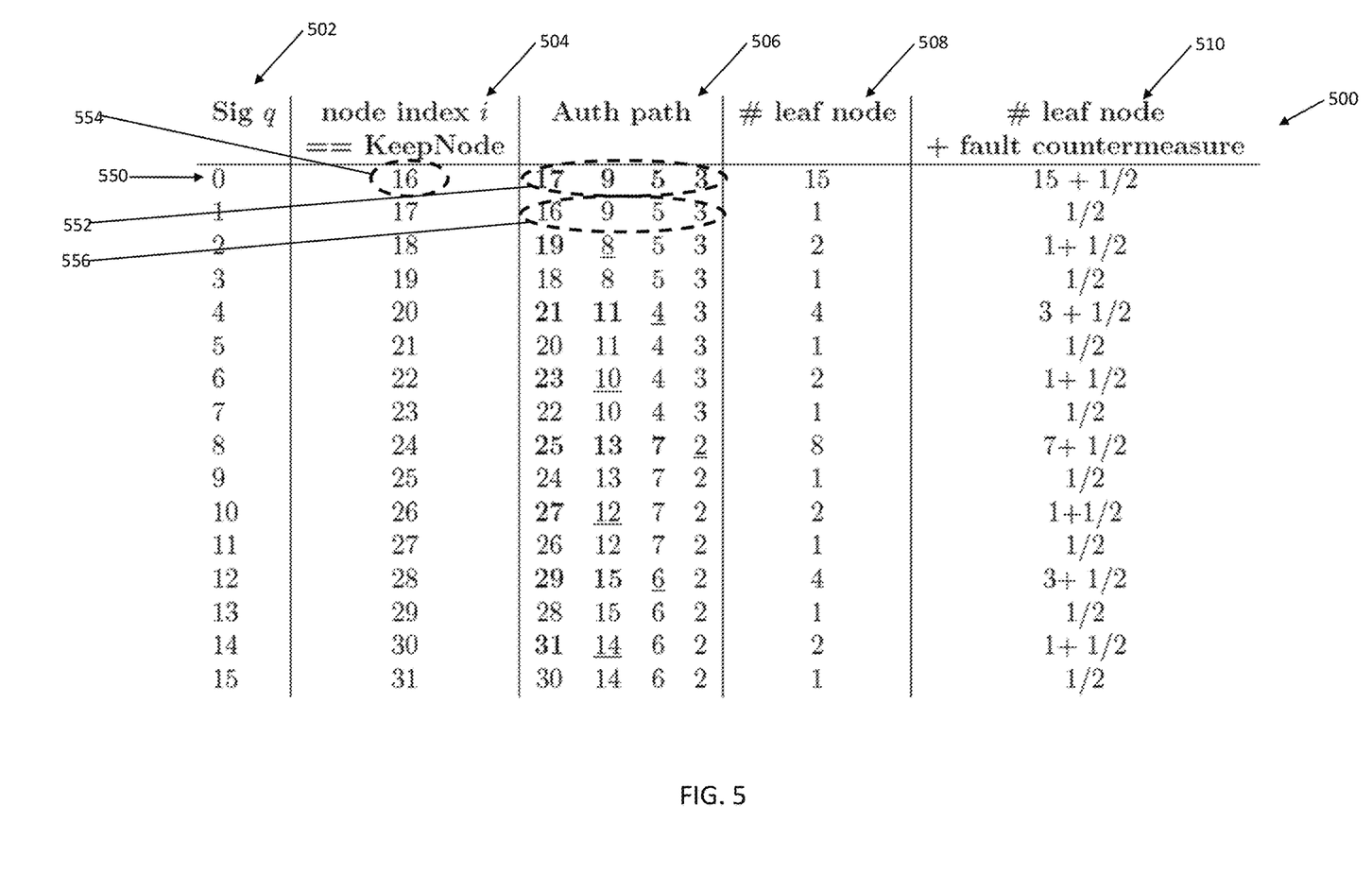
FIG. 5 is a table illustrating how KeepNode and authentication path values are determined when processing, sequentially, signatures using a Merkle tree.

To illustrate this approach, FIG. 5 is a table 500 illustrating how KeepNode and authentication path values are determined when processing, sequentially, signatures using the Merkle tree 100 of the present example. In table 500, the first column 502, Sig q, represents the index q of the OTS key pair used to process a signature. The second column 504, node index i==KeepNode, displays, for the given index q, the node associated with the OTS key used to process the signature, which is also the node whose value is retained/stored as the KeepNode. The third column 506, Auth Path, shows, for the given index q, the sequence of nodes that make up the authentication path. The fourth column 508, #leaf nodes, displays the number of leaf nodes that must be calculated to determine the authentication path for that index q, presuming that signatures are being processed in the sequence order. Finally, the fifth column 510, # leaf node+ fault measurement, indicates the number of leaf node calculations required to determine the signature and then validate that signature (as protection against a potential fault injection), per the approach described above.

Within table 500, if a node number in the authentication path is bolded, that indicates that the node in the authentication path is a right-hand node that must be calculated. Similarly, if a node number in the authentication path is underlined, that indicates that the node in the authentication path is a left-hand node that must be calculated. As this method stores previously calculated authentication path node data as well as the KeepNode value, node numbers in the third column 506 of table 500 that are neither bolded nor underlined do not require calculation, as those nodes values have been previously determined and stored and are available for processing.

Figure 6:
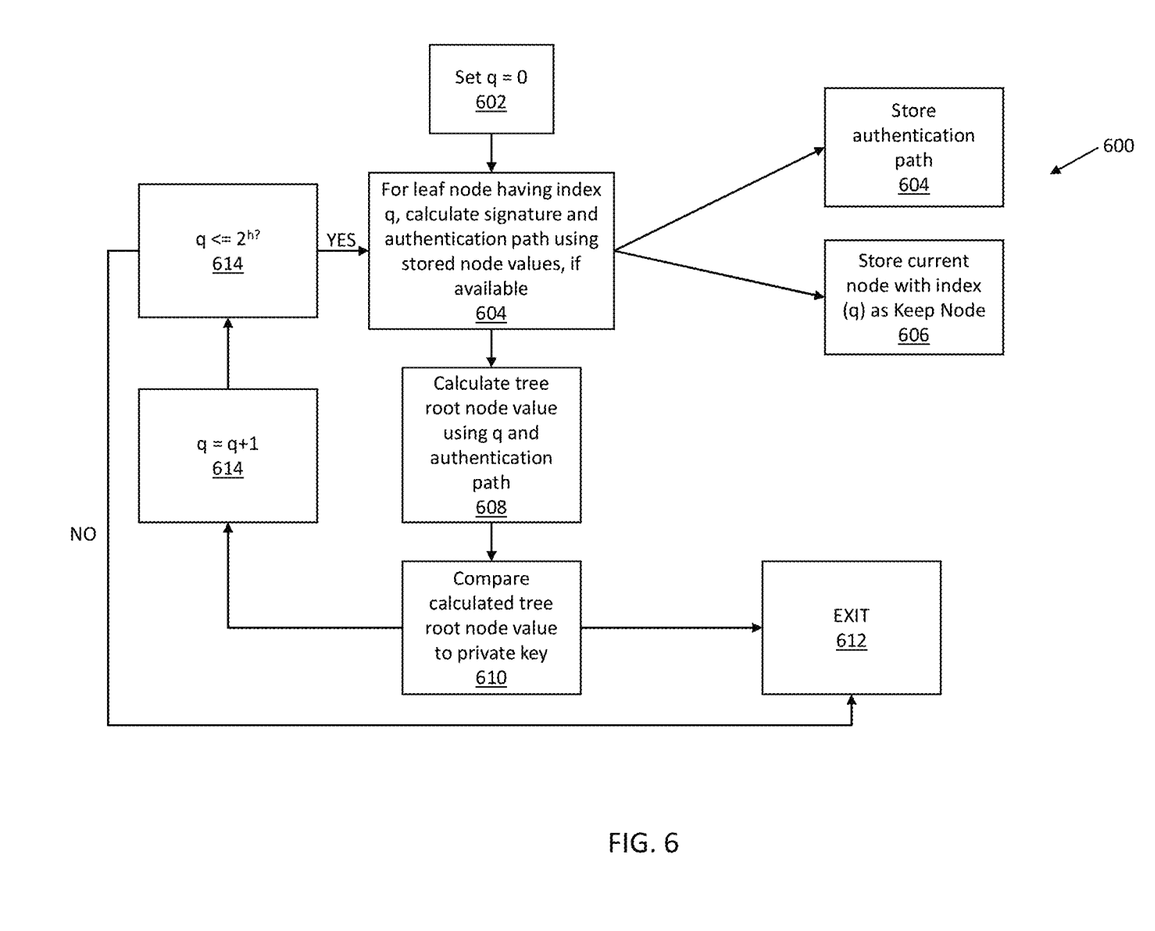
FIG. 6 is a flow chart depicting a method for performing Merkle tree traversal with fault-injection detection.

While referencing table 500 of FIG. 5, FIG. 6 is a flow chart depicting a method 600 for performing Merkle tree traversal with fault-injection detection in accordance with the present disclosure. The method of FIG. 6 may be implemented by a controller or processor of any suitably configured device. For example, method 600 may be executed by data processing system 720 of FIG. 7. Reference will be made to various functional components of data processing system 720, which are described in more detail below.

In a first step 602, method 600 is initialized by setting a current index value q equal to 0 to begin processing the first signature. At this time, key generation may be performed on the OTS key with index q=0 enabling the corresponding authentication path nodes to be determined and their values calculated. At that time, the authentication path node values could be stored and utilized in conjunction with the tree traversal algorithm depicted in FIG. 6.

Referring to FIG. 6, with the index value set, in step 604, the signature is calculated (e.g., by processor(s) 724 of data processing system 720) using the OTS private key associated with the leaf node of the pertinent Merkle tree (e.g., tree 100). In this step, the nodes of the authentication path are also calculated (e.g., by processor(s) 724). If the device executing method 600 has stored, due to a prior signature and authentication path calculation, those values are retrieved from an accessible computer readable memory system (e.g., memory 726) and are utilized when calculating the authentication path. As such, in each iteration of method 600 when determining the authentication path in step 604, the values of a first subset of nodes in the authentication path may be retrieved from memory 726 while the values of a second subset of nodes in the authentication path (i.e., those nodes whose values were not previously stored) will be directly calculated.

After completion of step 604, the values of the nodes of the authentication path calculated in step 604 are stored in a memory system (e.g., memory 726) of the device in step 604. Additionally, the calculated leaf node at the current index value is stored in the memory system (e.g., memory 726) at step 606.

With the signature (and authentication path) calculated, in step 608 the device executing method 600 uses the index value q and the authentication path calculated in step 604 to calculate a tree root node value according to a verification process as described above. That value, once calculated, is compared to the public key for the Merkle stored in a memory (e.g., memory 726) of the device in step 610, which is a known-good value for the root node of the Merkle tree being traversed by the device. If the two values are different, that is indicative of a potential fault injection attack or other error and method 600 can exit at step 612 with an error message or suitable alert flag being generated by the device (e.g., processor(s) 724 of data processing system 720).

If, however, in step 610 the calculated root node value and the private key value match, that indicates the signature is valid and the method moves to step 614 where the value of q is incremented in order to process a next signature. In step 614, if the incremented value of q is less than or equal to $2^h$ where h is the number of levels in the pertinent Merkle tree (in this example h=4), that indicates that there are additional leaf nodes (i.e., signatures) in the Merkle tree to process and the method returns to step 604 and is repeated. If, however, the incremented value of q is greater than $2^h$, that indicates that there are no additional leaf nodes in the Merkle tree to process and the method exits at step 612.

With reference to table 500 of FIG. 5, when step 604 is executed for the first time (i.e., with q=0, row 550 of table 500), each node of the authentication path (indicated by element 552) must be calculated as there are no previously calculated node values stored by the device. This is reflected in the first line of table 500 (i.e., with q=0) in which each node of the authentication path is bolded indicating that each of nodes 17, 9, 5, 3 must be calculated. Accordingly, the calculation cost for the first iteration of method 600 requires calculation of 15 leaf nodes of the authentication path and ½ leaf node for the validation process of steps 608 and 610 (see column 510). At the conclusion of this first iteration, the nodes of the authentication path, as well as the node being processed (i.e., the KeepNode—see element 554) are stored for later use. However, when method 600 repeats and step 604 is executed with q=1, the values of the entire authentication path 556 for q=1 (which includes nodes 16, 9, 5, and 3) can be retrieved from memory (the values of nodes 9, 5, and 3 were stored as part of the prior authentication path and the value of node 16 was stored as the KeepNode) and do not require recalculation. Accordingly, the second iteration of method 600 with q=1 requires calculation of only ½ leaf node in order to perform the validation of steps 608 and 610.

At the next iteration (q=2), the calculation of the authentication path requires calculation of two nodes (i.e., nodes 8 and 19), the other nodes of the authentication path (i.e., 5 and 3) can be retrieved from memory. Accordingly, the compute cost of the q=2 iteration of method 600 is 1 leaf node plus ½ leaf node in order to perform the validation of steps 608 and 610.

Method 600 continues execution in this manner until all signatures have been generated and validated.

As described above, method 600 provides a fault-injection countermeasure that saves computation time, while requiring an additional n bytes of storage (i.e., the Keep-Node value). The impact on computational burden in executing the first signature (e.g., with q=0) is likely minimal for the first signature (i.e., with index q=0) because all nodes in the authentication path A must be calculated (in the present example with h=4, this requires 15 leaf node calculations). Additionally, each signature requires an additional ½ leaf node computation to perform signature verification. However, for later signatures (e.g., with index q>0), the present method for Merkle tree traversal and signature verification requires ½ leaf node less computation (i.e. $w * \ell /2$ hash computations on average) as compared to conventional tree traversal approaches. Accordingly, when processing a number of signatures (e.g., more than 2 signatures), the present method provides computation savings (i.e., a saving of ½ leaf node for each signature) compared to conventional tree traversal methods while providing the added benefit of active fault detection countermeasures. In other embodiments, however, and as described above, the authentication path for the first signature, as well as the associated key values could be calculated and stored prior to execution of method 600.

Figure 7:
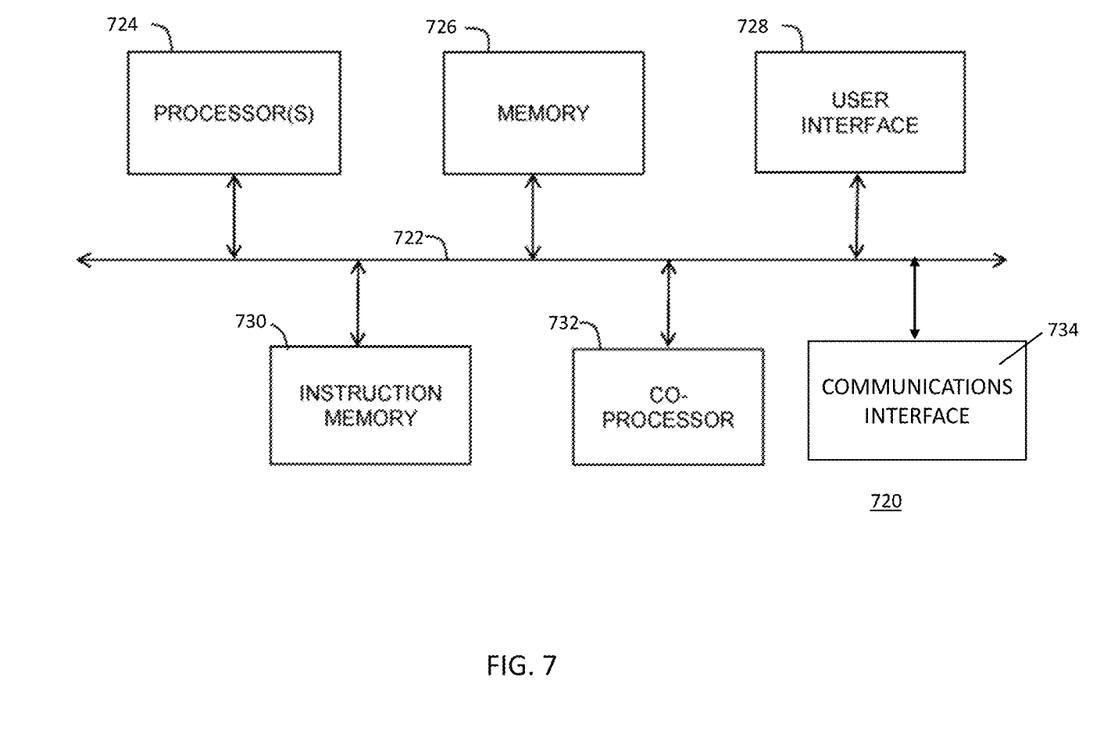
FIG. 7 is a block diagram depicting functional components of a data processing system including a co-processor for traversing a Merkle tree.

FIG. 7 is a block diagram depicting functional components of data processing system 720 including a co-processor 732 for traversing a Merkle tree. In various embodiments data processing system 720 may include a low resource computing system, such as an IoT device or other device having constrained memory and processing power. A constrained device may be defined as computing device configured to execute an HBS cryptosystem, where the device is incapable of storing the entire Merkle being utilized in conjunction with the encryption scheme. Alternatively, a constrained device may be one that cannot store the values of all nodes in the Merkle tree being utilized for the encryption scheme. In a typical HBS implementation, for example, where a Merkle tree may have a height of 20 layers and node size of 32 bytes, storage of the entire Merkle tree may be require at least 1 MB of memory (or more). Devices such as IoT devices (e.g., smart sensors, home automation devices, and the like) typically have less than 50 kB of secure working memory and so could be unable to store all node values for such a Merkle tree. In other embodiments, a typical Merkle tree may have 5 layers where each node of the Merkle tree has a value that is at least 24 bytes.

Data processing system 720 may be a system-on-a-chip (SoC) implemented on a single integrated circuit, or it may be a combination of chips. In other embodiments, data processing system 720 may be implemented within an integrated circuit that may include another type of circuit such as an ASIC (application specific integrated circuit), FPGA (field programmable gate array), or the like, that can provide execute instructions. In one embodiment, data processing system 720 may include metal-oxide semiconductor (MOS) transistors fabricated using a conventional complementary metal-oxide semiconductor (CMOS) process. In another embodiment, data processing system 720 may include other transistor types, such as bipolar, and may be manufactured with a different process.

Data processing system 720 includes communication bus 722, processor(s) 724, memory 726, and cryptography co-processor 732. Bus 722 may be a conventional bus having a plurality of conductors for communicating address, data, and control information. In other embodiments, bus 722 may be an interconnect structure such as for example, a cross-bar switch or other form of interconnect system. Processor(s) 724 is bi-directionally connected to bus 722. Processor(s) 724 may include one or more of any type of processing element, a processor core, microprocessor, microcontroller, field-programmable gate arrays (FPGAs), application-specific integrated circuits (ASICs), digital signal processor, and the like. There can be any number of processors.

Memory 726 is bi-directionally connected to bus 722. Memory 726 can be one or more of any type of volatile or non-volatile memory. Examples of memory types include non-volatile memories such as flash, one-time programmable (OTP), EEPROM (electrically erasable programmable read only memory), and the like. Volatile memory types include static random-access memory (SRAM) and dynamic random-access memory (DRAM). The memory may be used for storing instructions and/or data. Memory 726 is configured to store a data structure associated with at least a portion of the Merkle tree, wherein elements in the data structure are associated with nodes in the Merkle tree and a first element in the data structure is associated with a root node of the Merkle tree. In the present disclosure memory 726 represents the working memory of the data processing system 720. Data processing system 720 may have access to larger long-term storage devices (e.g., attached USB storage or remote cloud storage), however the working memory represents the memory available to data processing system 720 for use in actively implemented the methods described herein. As such, memory 726 is more analogous to a RAM memory than other long term storage solutions.

User interface 728 is bi-directionally connected to bus 722 and may be connected to one or more devices for enabling communication with a user such as an administrator. For example, user interface 728 may be enabled for coupling to a display, a mouse, a keyboard, or other input/output device. User interface 728 may also include a network interface having one or more devices for enabling communication with other hardware devices external to data processing system 720.

Network communication interface 734 is bi-directionally connected to bus 722 and is configured to transmit and receive data via a suitable communications network. In various embodiments, communications interface 734 may include a wired or wireless network adapter configured to communicate over a wired or wireless connection with a local area network. In other embodiments, communications interface 734 may be configured to communicate over a wide area network, such as a cellular network (e.g., LTE, 4G, 5G, etc.). Communications interface 734 is configured to transmit and receive data, such as cryptographic signatures, such as those described herein, to remove computing system that may, in turn, elect to validate and or otherwise utilized the cryptographic signatures. In various embodiments, for example, data processing system 720 may be configured to calculate a message signature for a data packet generated by processor(s) 724 of data processing system 720. In that case, both the signature and the data packet may be transmitted to a remote computer system that may, in turn, use the cryptographic signature to confirm the authenticity of the received data packet.

Instruction memory 730 may include one or more machine-readable storage media for storing instructions for execution by processor(s) 724. In other embodiments, both memories 726 and 730 may store data upon which processor(s) 724 may operate. Memories 726 and 730 may also store, for example, encryption, decryption, and verification applications. Memories 726 and 730 may be implemented in a secure hardware element and may be tamper resistant.

Co-processor 732 is bi-directionally connected to bus 722. Co-processor 732 may be a special type of a co-processor optimized for running encryption/decryption security software according to the RSA, ECC, or Advanced Encryption Standard (AES) or other type of commonly used encryption algorithms including those utilized in conjunction with HBS cryptosystems. Accordingly, and in accordance with the described embodiments, co-processor 732 may be used to efficiently execute instructions for performing Merkle tree traversal and signature verification as discussed above and illustrated in the flowchart of FIG. 6. The algorithm executed on co-processor 732 may be used to encrypt/decrypt data and instructions in data processing system 720.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

An embodiment of the present disclosure includes a device, including: a computer readable memory storing a plurality of private cryptographic keys, wherein each private cryptographic key in the plurality of private cryptographic keys is associated with a leaf node of a Merkle tree and the computer readable memory is configured to store a data structure associated with at least a portion of the Merkle tree, wherein elements in the data structure are associated with nodes in the Merkle tree and a first element in the data structure is associated with a root node of the Merkle tree; and a processor configured to perform steps including: generating a first signature using a first leaf node of the Merkle tree having a first index value by performing steps including: executing a cryptographic signing function on a first message using the private cryptographic key associated with the first leaf node of the Merkle tree to determine a first message signature and a value of the first leaf node, determining a first plurality of authentication path nodes in the Merkle tree, calculating values for each node in the first authentication path, storing, in the computer readable memory, the values for each node in the first authentication path and the value of the first leaf node, encoding the first message signature and the values of the nodes in the first authentication path into a first cryptographic signature message, and transmitting the first cryptographic signature message using a network communication interface; generating a second signature using a second leaf node of the Merkle tree having a second index value, wherein the second index value is one greater than the first index value, by performing steps including: executing the cryptographic signing function on a second message using the private cryptographic key associated with the second leaf node of the Merkle tree to determine a second message signature and a value of the second leaf node, determining a second plurality of authentication path nodes in the Merkle tree, retrieving, from the computer readable memory, values of a first subset of the second plurality of authentication path nodes, wherein nodes in the first subset of the second plurality of authentication path nodes are the first leaf node or are in the first plurality of authentication path nodes; calculating values for each node in a second subset of the second plurality of authentication path nodes, wherein nodes in the second subset of the second plurality of authentication path nodes are not the first leaf node and are not in the first plurality of authentication path nodes, storing, in the computer readable memory, the values for each node in the second authentication path and the value of the of the second leaf node, encoding the second message signature and the values of the nodes in the second authentication path into a second cryptographic signature message; and transmitting the second cryptographic signature message using the network communication interface.

An embodiment of the present disclosure includes a device, including: a computer readable memory storing a plurality of one-time signature (OTS) keypairs; and a processor configured to perform steps including: executing a hash function on a message using a first private key of a first OTS keypair of the plurality of OTS keypairs to determine a message signature, executing the hash function to calculate a leaf node value of a hash tree using the first OTS keypair, determining a plurality of authentication path nodes in the hash tree, retrieving, from the computer readable memory, values of a first subset of the plurality of authentication path nodes, calculating values for each node in a second subset of the plurality of authentication path nodes, and storing, in the computer readable memory, the values for each node in the authentication path and the value of the leaf node.

An embodiment of the present disclosure includes a method, including: executing a hash function on a message using a first private key of a first OTS keypair of a plurality of OTS keypairs to determine a message signature; executing the hash function to calculate a leaf node value of a hash tree using the first OTS keypair; determining a plurality of authentication path nodes in the hash tree; retrieving, from a computer readable memory, values of a first subset of the plurality of authentication path nodes; calculating values for each node in a second subset of the plurality of authentication path nodes; and storing, in the computer readable memory, the values for each node in the authentication path and the value of the of the leaf node.

Although the examples have been described with reference to automotive radar systems, the systems and methods described herein may be implemented in conjunction with other types of radar systems. Devices or components described as being separate may be integrated in a single physical device. Also, the units and circuits may be suitably combined in one or more semiconductor devices. That is, the devices described herein may be implemented as a single integrated circuit, or as multiple integrated circuits.

The preceding detailed description is merely illustrative in nature and is not intended to limit the embodiments of the subject matter or the application and uses of such embodiments.

As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or detailed description.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematic shown in the figures depict one exemplary arrangement of elements, additional intervening elements, devices, features, or components may be present in an embodiment of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A device, comprising:
   a computer readable memory storing a plurality of private cryptographic keys, wherein each private cryptographic key in the plurality of private cryptographic keys is associated with a respective leaf node of a Merkle tree and the computer readable memory is configured to store a data structure associated with at least a portion of the Merkle tree, wherein elements in the data structure are associated with corresponding nodes in the Merkle tree and a first element in the data structure is associated with a root node of the Merkle tree; and
   a processor configured, using a first leaf node of the Merkle tree having a first index value, to perform steps including:
   executing a cryptographic signing function on a first message using the private cryptographic key associated with the first leaf node of the Merkle tree to determine a first message signature and a value of the first leaf node;
   determining a first authentication path associated with the first leaf node that includes a first plurality of path nodes in the Merkle tree associated with the first leaf node;
   calculating values for each path node included in the first authentication path;
   storing, in the computer readable memory, the values for each path node in the first authentication path and the value of the first leaf node;
   encoding the first message signature and the values of the path nodes in the first authentication path into a first cryptographic signature message; and
   transmitting the first cryptographic signature message using a network communication interface;
   wherein the processor is further configured, using a second leaf node of the Merkle tree having a second index value that is one greater than the first index value, to perform steps including:
   executing the cryptographic signing function on a second message using the private cryptographic key associated with the second leaf node of the Merkle tree to determine a second message signature and a value of the second leaf node;
   determining a second authentication path associated with the second leaf node that includes a second plurality of path nodes in the Merkle tree associated with the second leaf node;
   retrieving, from the computer readable memory, values for each path node in a first subset of path nodes in the second authentication path, wherein path nodes in the first subset of path nodes in the second authentication path are the first leaf node or are included in the first authentication path;
   calculating values for each path node in a second subset of the second authentication path, wherein path nodes in the second subset of the second authentication path are not the first leaf node and are not in the first authentication path;
   storing, in the computer readable memory, the values for each path node in the second authentication path and the value of the of the second leaf node;
   encoding the second message signature and the values of the path nodes in the second authentication path into a second cryptographic signature message; and
   transmitting the second cryptographic signature message using the network communication interface; and
   wherein the processor is further configured to validate the second cryptographic signature message without re-executing the cryptographic signing function on the second message to determine a third message signature by using the values stored in the computer readable memory for each path node in the second authentication path and the value stored in the computer readable memory for the second leaf node.

2. The device of claim 1, wherein the processor is configured to validate the second cryptographic signature message to detect an error in the second cryptographic signature message.

3. The device of claim 2, wherein the computer readable memory stores a public key of the Merkle tree and the processor is configured to validate the second cryptographic signature message by performing steps including:
   determining a calculated root node value of the Merkle tree using the values of the first subset of the second plurality of authentication path nodes and the values of the second subset of the second plurality of authentication path nodes; and
   comparing the calculated root node value to the public key of the Merkle tree.

4. The device of claim 3, wherein the public key of the Merkle tree is equal to a value of a root node of the Merkle tree.

5. The device of claim 1, wherein the Merkle tree includes at least five layers.

6. The device of claim 1, wherein each value of each node in the Merkle tree includes at least 24 bytes and the device cannot store the values of each node in the Merkle tree in the computer readable memory at the same time.

7. A device, comprising:
a computer readable memory storing a plurality of one-time signature (OTS) keypairs associated with corresponding leaf nodes of a hash tree; and
a processor configured to perform steps including:
 executing a hash function on a message using a first private key of a first OTS keypair of the plurality of OTS keypairs to determine a message signature;
 executing the hash function to calculate a leaf node value of the hash tree associated with the first OTS keypair using the first OTS keypair;
 determining an authentication path between the leaf node of the hash tree and a root node of the hash tree that includes a plurality of path nodes;
 retrieving, from the computer readable memory, corresponding values for each path node in a first subset of the plurality of path nodes included in the authentication path;
 calculating corresponding values for each node in a second subset of the plurality of path nodes in the authentication path; and
 storing, in the computer readable memory, the corresponding values for each path node in the second subset of the plurality of path nodes in the authentication path and the value of the leaf node; and
 encoding the message signature and the values corresponding to each path nodes in the authentication path into a cryptographic signature message;
wherein the computer readable memory stores a public key of the hash tree and the processor is further configured to perform steps including:
 determining a calculated value corresponding to the root node of the hash tree using the values corresponding to each path node of the first subset of the plurality of path nodes in the authentication path and the values corresponding to each path node of the second subset of the plurality of path nodes in the authentication path;
 comparing the calculated value corresponding to the root node to the public key of the hash tree; and
 validating the cryptographic signature message using the corresponding values stored in the computer readable memory for each path node in the authentication path and the value stored in the computer readable memory for the leaf node without re-executing the hash function on the message to determine a second message signature.

8. The device of claim 7, wherein the first subset of path nodes in the authentication path does not include any path nodes that are in the second subset of path nodes in the authentication path.

9. The device of claim 7, wherein the processor is configured to perform steps including validating the cryptographic signature message to detect an error in the cryptographic signature message.

10. The device of claim 9, wherein the computer readable memory stores a public key of the hash tree and the processor is configured to validate the cryptographic signature message by performing steps including:
 determining calculated value corresponding to the root node of the hash tree using the values corresponding to each path node of the first subset of path nodes in the authentication path and the values corresponding to each path node of the second subset of path nodes in the authentication path; and
 comparing the calculated value corresponding to the root node to the public key of the hash tree.

11. The device of claim 7, wherein the hash tree includes at least five layers.

12. The device of claim 11, wherein each value of each node in the hash tree includes at least 24 bytes and the device cannot store the values of each node in the hash tree in the computer readable memory at the same time.

13. A method, comprising:
 executing a hash function on a message using a first private key of a first OTS keypair of a plurality of OTS keypairs corresponding to respective leaf nodes of as hash tree to determine a message signature;
 executing the hash function to calculate a value of a leaf node of the hash tree using the first OTS keypair;
 determining an authentication path between a root node of the hash tree and the leaf node that includes a plurality of path nodes in the hash tree;
 retrieving, from a computer readable memory, values corresponding to each path node of a first subset of the path nodes in the authentication path;
 calculating values corresponding to each path node in a second subset of the path nodes in the authentication path;
 storing, in the computer readable memory, the values corresponding to each path node in the authentication path and the value corresponding to the leaf node;
 encoding the message signature and the values corresponding to each path node in the authentication path into a cryptographic signature message; and
 validating the cryptographic signature message to detect an error in the cryptographic signature message without re-executing the hash function on the message to determine a second message signature using the values stored in the computer readable memory for corresponding to each path node in the authentication path and the value stored in the computer readable memory corresponding to the leaf node.

14. The method of claim 13, further comprising:
 determining a calculated root node value of the hash tree using the values corresponding to each path node of the first subset of path nodes in the authentication path and the values corresponding to each path node of the second subset of path nodes in the authentication path; and
 comparing the calculated root node value to a public key associated with the hash tree.

* * * * *